March 20, 1956   L. DUFOUR   2,738,848
AGRICULTURAL TRACTOR WITH ROCKING SECTION
Filed May 8, 1953
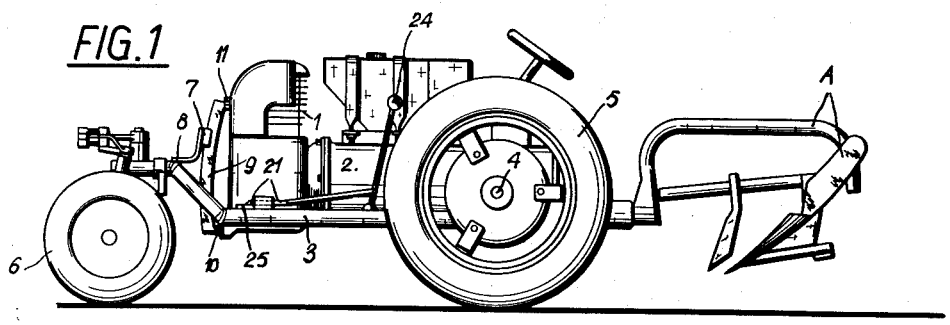
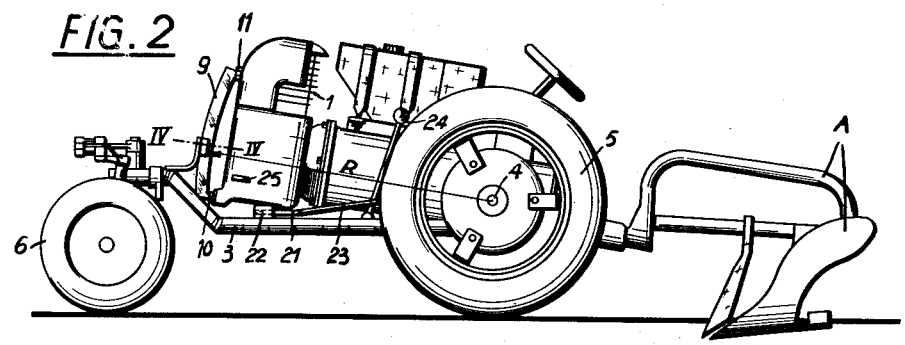
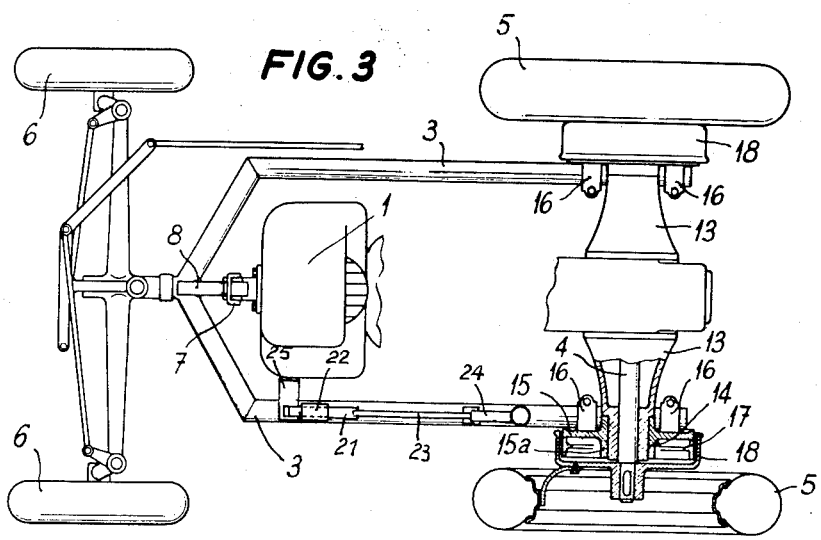
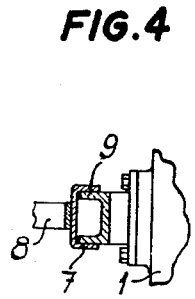

United States Patent Office 2,738,848
Patented Mar. 20, 1956

2,738,848

AGRICULTURAL TRACTOR WITH ROCKING SECTION

Leon Dufour, Geneva, Switzerland

Application May 8, 1953, Serial No. 353,865

Claims priority, application Switzerland May 9, 1952

2 Claims. (Cl. 180—54)

My invention has for its object a tractor for agricultural and transportation purposes of the type including on the one hand a chassis the front end of which is provided with at least one steering wheel and the rear end of which is provided with two driving wheels and, on the other hand, a rocking section carrying the engine and the transmission means operatively connecting the latter with the driving wheels, said rocking section being pivotally secured to the chassis along an axis aligned with the axis of the rear wheels so as to allow said rocking part to rock in a vertical plane.

It has already been proposed to execute agricultural and road tractors of the above type, in which tractors the rocking section is balanced by the associated implement such as a plough, an agricultural cutter, a reaper or the like or again by the load drawn along by the tractor, whereby the weight of the heavier parts of the tractor such as the engine and the transmitting means, and also that of the implement, are concentrated on the rear axle, whereby the adherence is considerably increased. When inoperative, the rocking section of the tractor rests on the chassis.

However, the non-rocking section which is constituted solely by the chassis, assuming the shape of an open frame, surrounding the rocking part and carrying to the front the steering wheels in the case of a tractor with four wheels or a single steering wheel in the case of a tractor with three wheels, forms a comparatively light structure which, by reason of the stresses to which the front wheels are submitted, is readily deformed. The result of such deformations consists in that the front part of the chassis that is furthest removed from the back axle, which latter forms the sole connection between the chassis and the remainder of the tractor, has a tendency to be shifted transversely with reference to the rocking section and this is obviously an objectionable feature which it is desirable to cut out, as provided by my invention.

The tractor according to my invention is characterized by the feature that the chassis carries in its front section and in the longitudinal plane of symmetry of the tractor, a guide cooperating with at least one arcuate member secured to the rocking section and located in a plane perpendicular to the axis of the driving wheels, the center of curvature of said arcuate member lying on said axis; this arrangement is such that it prevents any lateral shifting of the chassis with reference to the rocking section, without this leading to any reduction in the amplitude of the oscillations of the rocking section.

I have illustrated by way of example in the accompanying drawings a preferred embodiment of the object of my invention. In said drawings:

Fig. 1 is an elevational view of the tractor, the rocking part of which is in its inoperative position;

Fig. 2 is an elevational view of the same tractor the rocking part of which is in an intermediate rocked position;

Fig. 3 is a plan view of the tractor at a greater scale, certain parts of which are shown sectionally whilst the implement is removed.

Fig. 4 is a sectional view, at a greater scale, of a detail, along line IV—IV of Fig. 2.

The tractor illustrated includes on the one hand a rocking section carrying the engine 1 and the change speed gear 2 carrying on its rear end an agricultural implement A, and on the other hand a stationary part including a chassis constituted by a tubular frame 3. The rocking section carries the axle housing 13 through which extend the axles 4 carrying each a driving wheel 5. The ends of the axle housing are each provided with a bearing 14 on which is revolubly mounted a flange 15 provided with a hub 15a to which is secured through the straps 16 the above mentioned frame 3 carrying the set of steering wheels 6. The rocking section is thus pivotally secured to the chassis round an axis which is coaxial with the axis of the rear wheels. Brake linings 17 cooperating with drums 18 secured to the wheels 5 are secured to the flanges 15, whereby the braking consists in making the wheels transiently rigid with the chassis, while the rocking section of the tractor retains its freedom of movement. This rocking section is held in its inoperative position, shown in Fig. 1, by a retractable thrusting member 21 adapted to be reciprocated in a sleeve 22 fastened to the frame 3 and connected by link 23 to a controlling lever 24. The engine 1 is provided with a lateral lug 25 that, in the position shown on Fig. 1, is applied on the frame 3 and held on the same by the thrusting member 21 in its operative position.

As shown in Fig. 2, when the thrusting member 21 is retracted by rocking the lever 24 to the right hand side, the lug 25 is no longer held between said member 21 and the frame 3. The rocking section 1, 2, A can thus be pivoted into its operative position where the agricultural implement A is working.

The chassis is comparatively light with reference to the remainder of the tractor and, in order to prevent the front part of the chassis from being shifted laterally with reference to the rocking section under the action of the deformations of said chassis produced by the stresses to which the front wheels may be submitted, said front part carries a U-shaped guiding member 7 that is secured to a support 8 rigid with the chassis and is adapted to cooperate with two arcuate flat members 9 the radius of which is R and the centre of curvature of which, as shown in Fig. 2, is located on the pivotal axis of the rocking section. These flat arcuate members 9 are secured through their upper and lower ends 10 and 11 to the engine body and extend between the flanges of the guiding member 7, which form a lateral stop for the rocking section. Said arcuate flat members are slightly spaced so that they define between each other a gap through which it is possible to introduce the engine-starting handle. This arrangement prevents any lateral shifting of the front part of the chassis 3 with reference to the rocking section of the tractor, without this hindering by any means the vertical movements of said rocking section.

In a modification, the U-shaped guiding member 7 may be cut out and replaced by a simple flat member extending between the flat arcuate members 9 in which case said guiding member 7 may simply form the end of the support 8 which, in this case, is slightly longer than in the embodiment illustrated.

What I claim is:

1. In a tractor for agricultural and transportation purposes, including a chassis, at least one steering wheel to the front thereof, two driving wheels to the rear of the chassis, a rocking section pivotally secured to the chassis and adapted to rock with reference thereto round the axis of the rear wheels, and an engine carried by said rocking section, means carried by the rocking section for operatively connecting the engine with the rear wheels; a guiding member rigid with the chassis in the front portion of the longitudinal plane of symmetry of said chassis, and an arcuate member rigid with the rocking section and extending in a plane perpendicular to the axis of the driving wheels and having its center of curvature on said axis, said arcuate member engaging slidingly the guiding member to constrain the rocking section to remain in constant vertical register with the chassis.

2. In a tractor for agricultural and transportation purposes, including a chassis, at least one steering wheel to the front thereof, two driving wheels to the rear of the chassis, a rocking section pivotally secured to the chassis and adapted to rock with reference thereto round the axis of the rear wheels, and an engine carried by said rocking section, means carried by the rocking section for operatively connecting the engine with the rear wheels; two flat arcuate members located to either side of the longitudinal axis of the engine, extending in planes perpendicular to the axis of the driving wheels and having their centers of curvature on said axis, and a U-shaped member rigid with the chassis in the front portion of the longitudinal plane of symmetry of said chassis and the upstanding flanges of which form guides for the corresponding arcuate members during the rocking of the rocking section.

References Cited in the file of this patent

UNITED STATES PATENTS

| | | |
|---|---|---|
| 1,207,343 | Taylor | Dec. 5, 1916 |
| 2,035,150 | Dufour | Mar. 24, 1936 |
| 2,429,711 | Dufour | Jan. 23, 1946 |
| 2,577,237 | Dufour | Dec. 4, 1951 |
| 2,640,403 | Halverson | June 2, 1953 |